United States Patent [19]

Tournier

[11] Patent Number: 4,497,200
[45] Date of Patent: Feb. 5, 1985

[54] METHOD AND DEVICE FOR EVALUATION AND INDICATION OF WEAR CONDITION OF MOTOR LUBRICATION

[75] Inventor: Michel Tournier, Mont Saint Aignan, France

[73] Assignee: Esso Societe Anonyme Francaise, Courbevoie, France

[21] Appl. No.: 484,078

[22] Filed: Apr. 11, 1983

[30] Foreign Application Priority Data

Apr. 13, 1982 [FR] France ................... 82 06331

[51] Int. Cl.$^3$ .............................................. G01M 15/00
[52] U.S. Cl. ....................................... 73/64; 73/117.3; 340/59
[58] Field of Search .................. 73/10, 116, 117.3, 64; 340/59

[56] References Cited

U.S. PATENT DOCUMENTS 3,526,127 9/1970 Sarkis ........................ 73/116 X
3,561,270 2/1971 Sessler ........................ 73/362

FOREIGN PATENT DOCUMENTS 1479532 5/1967 France .
2426931 12/1979 France .
666460 6/1979 U.S.S.R. ...................... 73/117.3

Primary Examiner—Jerry W. Myracle
Attorney, Agent, or Firm—Karl W. Flocks; Sheridan Neimark; A. Fred Starobin

[57] ABSTRACT

A method and a device are used for evaluating and indicating the wear conditions of a motor lubrication oil. The device comprises a motor oil temperature sensor, an electronic unit comprising a threshold detector and an analog circuit which receives a signal from the temperature sensor to supply a first current proportional to a temperature variation either below or above a satisfactory temperature for the oil, an integrating counter supplied with a second current in idle periods and a third current in periods of utilization, the sum of the three currents being integrated, and a signaling device associated with the threshold detector for measuring any voltage increase across the integrating counter. The invention is applicable to motor instruments, especially, automotive vehicle motors.

6 Claims, 2 Drawing Figures

OIL TEMPERATURE

METHOD AND DEVICE FOR EVALUATION AND INDICATION OF WEAR CONDITION OF MOTOR LUBRICATION

This invention relates to a method and a device for permitting evaluation and indication of the wear conditions of the lubrication oil in a motor, especially a motor of automotive vehicle.

Due to the absence of a simple criterion for evaluating the condition of the oil in motors, the manufacturers recommend for a given quality level to replace oil in motors either after a given working period (stationary motors, tractors, and so on) or after a given distance travelled (cars, trucks, busses, and so on).

This concept is not satisfactory especially in the case of vehicles due to the very variable conditions of utilization of such vehicles.

The lubricant fatigues little under moderate conditions, much under a low load, low temperature and after each starting period, since the combustion is then poor and the excess of fuel is significant; it fatigues much under high load conditions and high temperature conditions when the partial vaporization and oxidation phenomena become very significant.

In the present time, when it is required to use at the very best products and materials, it is regrettable both to have to reject a lubricant which is still perfectly usable and to use for too long a period an exhausted lubricant thereby affecting the longevity of the material.

The object of this invention is to evaluate with a reasonable approximation the wear of the lubricant by taking into account its intrinsic quality and the work done thereby, then to warn the user when the time has come to replace the exhausted lubricant.

Nowadays two sorts of equipment are used or have been proposed therefor, either simple running time counters, or totalizing counters responsive to both the running time and the number of starts.

Due to their basic design they cannot correctly solve the problem underlying the invention.

The method according to this invention consists of electrically simulating the wear conditions of a motor oil by taking into account the time of presence of the oil in said motor, the running time of the motor and the periods during which the oil being too hot or too cold fatigues abnormally.

The wear of the oil is represented by the integration of an electric current the intensity of which depends on the motor running conditions, with the integral of this function producing a signal when it reaches a given value depending on the initial quality of the oil and possibly the characteristics of the motor and/or the vehicle.

The intensity of the integrated current is the sum of the intensities of four currents:

a constant term, during all the time of presence of the oil in the motor, leading to replacement of such oil for example every year or every other year, when the vehicle has not been utilized;

a constant term for the running time of the motor, said term corresponding to the running conditions most favorable to the longevity of the oil;

two terms depending on the conditions of utilization of the oil; it is to be noted that the oil temperature constitutes an easily measurable criterion characterizing the conditions of use of the oil.

As a matter of fact, the oil or lubricant fatigues little under stabilized average utilization conditions at temperatures for example of between 50° and 100° C.; it fatigues much when starting up from cold until its temperature has reached about 50° C. or when particular running conditions (low load, very low ambient temperature) result in temperatures lower than this value; the more its temperature increases above 100° C. for example, the more it fatigues.

Another object of this invention is a device for evaluating oil conditions in a motor by taking into account the effective running and resting conditions of the motor so as to be able to warn the user when the oil being exhausted must be replaced, said device being characterized in that it comprises:

a motor oil temperature sensor;

an electronic unit comprising a threshold detector and an analog circuit which receives a signal from said temperature sensor and supplies a first current $i_3$ proportional to a temperature variation either below or above a satisfactory temperature for the oil;

an integrating counter supplied with a second current $i_1$ in idle periods and a third current $i_2$ in periods of utilization, the sum of currents $i_1$, $i_2$, $i_3$ being integrated;

and a signaling means associated with said threshold detector for measuring any increase in the voltage across said integrating counter.

Other characteristics and advantages of this invention will appear from the following description made in reference to the attached drawings in which.

The oil wear from the time of utilization can be represented by a function of the following type:

$$U = at_1 + bt_2 + c \int_{t_3} (50 - t_h) dt + d \int_{t_4} (t_h - 100) dt$$

where:

$t_1$ is the time of presence of oil in the motor,
$t_2$ the running time of the motor,
$t_3$ the running time at low temperature,
$t_4$ the running time at high temperature,
$t_h$ the oil temperature in the motor,
a, b, c, d are constants for a given oil quality and a given vehicle.

The first two terms are obvious.

The third term corresponds to the supplementary oil fatigue caused by a running condition at too low a temperature, considered here to be lower than 50° C.; it integrates the influence of the runnings to take into account the time period required for reaching a satisfactory temperature from the motor temperature at the start up time. As a first approximation, one may admit here an oil fatigue proportional to the variation between 50° C. and the actual oil temperature; the constant coefficient c corresponds to a linear temperature increase as a function of time for an average utilization. A more complex function can be employed depending on the contemplated accuracy.

The fourth term corresponds to complementary oil fatigue caused at a high temperature (considered here as being higher than 100° C.) by high speed and high loads (for example towing); as for the third term, it can be admitted here that the supplementary fatigue is proportional to the difference between the actual temperature of oil and 100° C.; the coefficient d is also constant.

These four terms can be represented by electric analog currents the sum of which is integrated for example in a permanent reading electrolytic integrating counter. When the integral reaches the maximum capacity of such integrator, a threshold detector senses the corresponding voltage increase and warns the user (for example by switching on a control lamp) that the oil of the motor being exhausted must be replaced.

The counter is then reset by overturning it when the oil has been replaced and the system is ready for evaluating the wear of a new charge of oil.

Figure 1:
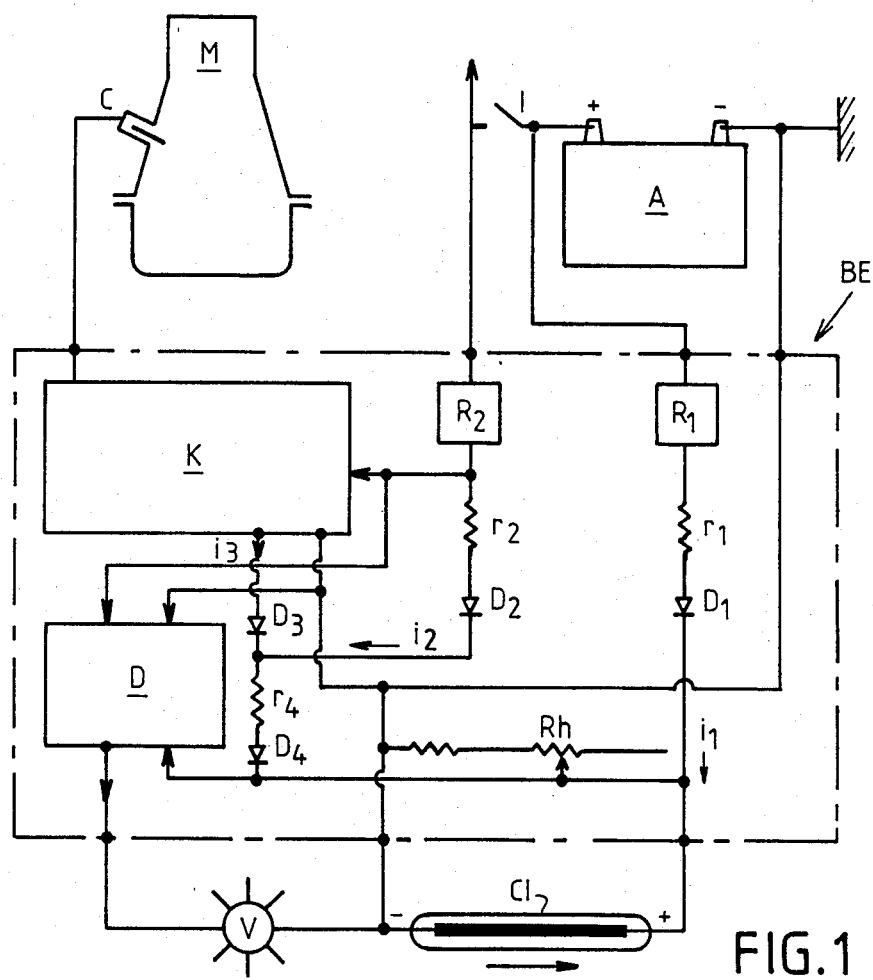
FIG. 1 is a schematic diagram of a device according to the invention.

An analog device according to the invention for evaluating the oil conditions of a motor by taking into account effective running and resting conditions and warning the user when the oil, being exhausted must be replaced, comprises (see FIG. 1):

two connections to the electric circuit of the vehicle: i.e. one directly to the storage battery A, and the other after switching on the contact I for starting the motor;

an oil temperature sensor C secured to the motor M by using for example one of the generally available orifices in the device for distributing lubrication oil to the various elements in the motor;

an electronic unit (block BE);

a warning control light V and an electrolytic integrating counter CI of known type, both of such elements being secured to the instrument panels of the vehicle and being made visible and accessible to the driver.

The electronic unit BE comprises a first circuit $R_1$, $r_1$, $D_1$ and a second circuit $R_2$, $r_2$, $D_2$, $r_4$, $D_4$, between the power supply and the counter CI. It also comprises an analog circuit K to which the temperature sensor C is connected, a threshold detector D to which the control light V and a rheostat Rh are connected.

Electronic unit or block BE operates as follows:

The storage battery directly supplies current i through the circuit $R_1$, $r_1$, $D_1$ to the counter CI, with current i being such that when the vehicle is not being utilized the integrating counter is saturated for example after about one year thereby implying systematic replacement of the lubricant.

After switching on contact I the storage battery supplies through circuit $R_2$, $r_2$, $D_2$, $r_4$, $D_4$ to the counter CI a current $i_2$ which corresponds to the saturation of the counter for the longest distance travelled that can be assured with such oil under the condition that the oil temperature is constantly maintained in the optimum operative range (for example between 50° and 100° C.).

Figure 2:
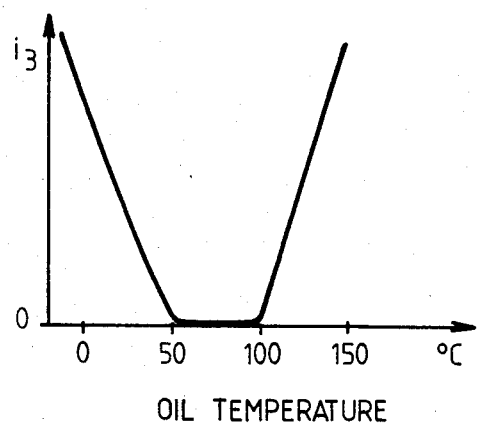
FIG. 2 represents the curve of the current from the analog circuit K as a function of the motor oil temperature as measured by sensor C.

The sensor C may be of any type (thermocouple, metallic resistance or semiconductor probe, and so on) and supplies a signal to analog circuit K which produces a current $i_3$ depending on the oil temperature for example according to the curve shown in FIG. 2. Such current $i_3$ added to currents $i_1$ and $i_2$ is supplied to counter CI; it corresponds to the increased fatigue of the lubricant when the oil temperature is too low or too high for optimum operation of the motor.

The rheostat Rh derives a fraction of currents $i_2$ and $i_3$ from the integrating counter CI. In this way one can adjust the sensitivity of the system depending on the specific motor requirements and the quality level of the lubricant used.

As long as the counter CI is not saturated (the electrolyte bubble between both mercury columns has not reached one of the electrodes), the voltage across the counter terminals is low for any contemplated values of $i_1 + i_2 + i_3$. However, as soon as one of the mercury columns is cancelled, the voltage increases abruptly, then the threshold detector D measuring the voltage switches on the control light V to thereby inform the user of the necessity of replacing the motor oil.

If such integrating counter was selected to be of the reversible type, it is then sufficient to turn it over so that it can again evaluate the fatigue of a new oil charge.

Subsidiarily, an oil level detector (not shown), housed in the motor and associated with the above-mentioned circuits can warn the user by switching on another control light that the oil in his motor, not having however lost its qualities, must be replenished to compensate for any consumed portion thereof.

Finally, it will be noted that this invention was only described and represented in a preferential exemplifying form of embodiment and that equivalent parts can be substituted for its constituents without however departing from the scope of the invention as defined in the appended claims.

I claim:

1. A method of evaluating and indicating the wear condition of the lubrication oil in a motor comprising the steps of integrating an electric current representing the sensed values of a temperature variable, consisting of variables used as a criterion characterizing several different fatigue conditions of the oil, said variable being then specific to the period of presence of said oil in said motor, to the working time of said motor and the time periods during which the oil being too hot or too cold wears abnormally, and signalling the reaching of the fatigue condition of the oil based on said integrating.

2. A method according to claim 1, wherein the intensity of said current is the sum of four currents, i.e. a constant term for all the time of presence of the oil in the motor when the latter is not being used; a constant term for the working time of the motor; and two terms depending on the conditions of use of the oil.

3. A device for evaluating and indicating the wear conditions of lubrication oil in a motor, with an electric storage source, through the integration of an electric current representing the sensed values of a temperature variable, comprising:

a temperature sensor for the oil of said motor;

a threshold detector;

an analog circuit;

an electronic unit comprising said threshold detector and said analog circuit which latter circuit receives a signal from said temperature sensor and supplies a first current proportional to a temperature variation either below or above a satisfactory temperature for the oil;

an integrating counter supplied which a second current from the electric storage source in idle periods from a third current from the electric storage source through a motor starting contact in periods of utilization for integrating the sum of the first, the second and the third currents; and a signaling means associated with said threshold detector and measuring any voltage increase across said integrating counter.

4. A device according to claim 3, wherein said integrating counter is a visually accessible electrolytic integrating counter within reach of the user.

5. A device according to claim 3 comprising a rheostat for deriving a portion of said first and third currents from said integrating counter to thereby permit adjustment of the sensitivity of the assembly.

6. A device according to claim 3, comprising a complementary associated circuit in form of an oil level detector connected from the motor to a second signaling means to indicate low oil level.

* * * * *